United States Patent
Götz et al.

(10) Patent No.: US 10,115,117 B2
(45) Date of Patent: Oct. 30, 2018

(54) OBTAINING AND USING VEHICLE RELATED DATA

(71) Applicant: ThinxNet GmbH, Munich (DE)

(72) Inventors: Oliver Götz, Grafelfing (DE); Jens Hutzschenreuter, Stuttgart (DE)

(73) Assignee: ThinxNet GmbH, Munich (DE)

(*) Notice: Subject to any disclaimer, the term of this patent is extended or adjusted under 35 U.S.C. 154(b) by 0 days.

(21) Appl. No.: 14/755,436

(22) Filed: Jun. 30, 2015

(65) Prior Publication Data

US 2015/0379784 A1 Dec. 31, 2015

Related U.S. Application Data

(60) Provisional application No. 62/018,904, filed on Jun. 30, 2014.

(51) Int. Cl.
*G06Q 30/02* (2012.01)
*G07C 5/00* (2006.01)

(52) U.S. Cl.
CPC ..... *G06Q 30/0201* (2013.01); *G06Q 30/0217* (2013.01); *G07C 5/008* (2013.01); *G07C 2205/02* (2013.01)

(58) Field of Classification Search
None
See application file for complete search history.

(56) References Cited

U.S. PATENT DOCUMENTS

| 8,489,326 B1* | 7/2013 | Na | G01C 21/20 |
| | | | 701/25 |
| 8,805,709 B2* | 8/2014 | Grosso | G06Q 40/08 |
| | | | 701/29.1 |
| 8,996,234 B1* | 3/2015 | Tamari | G07C 5/0808 |
| | | | 701/123 |
| 9,454,786 B1* | 9/2016 | Srey | G06Q 40/08 |
| 2004/0117195 A1 | 6/2004 | Bodin | |

(Continued)

FOREIGN PATENT DOCUMENTS

| DE | 102011076638 A1 | 11/2012 |
| WO | 2012/163861 A1 | 12/2012 |

(Continued)

OTHER PUBLICATIONS telematrix.com—services, "Financial Asset Management," Sep. 14, 2016, pp. 1-4.

(Continued)

*Primary Examiner* — Krishnan Ramesh
(74) *Attorney, Agent, or Firm* — Fox Rothschild LLP; Robert J. Sacco; Carol E. Thorstad-Forsyth

(57) ABSTRACT

A mobility status of a vehicle is estimated based on received data from a data collection device associated with a vehicle. The received data includes a first data set collected at a first point of time and a second data set collected at a second point of time. The mobility status of the vehicle is estimated based on a difference between values or a status change of at least one common parameter of the first data set and the second data set and based on the time difference between the first point of time and the second point of time. The estimated mobility status of the vehicle is stored at multiple points of time in a vehicle-specific mobility status database.

12 Claims, 6 Drawing Sheets

(56) References Cited

U.S. PATENT DOCUMENTS

| | | | | |
|---|---|---|---|---|
| 2009/0062978 A1* | 3/2009 | Picard | ................... | G06Q 10/06 |
| | | | | 701/31.4 |
| 2010/0205071 A1* | 8/2010 | Rangel | ................. | G06Q 30/0257 |
| | | | | 705/28 |
| 2011/0106370 A1* | 5/2011 | Duddle | .................. | G06Q 40/08 |
| | | | | 701/31.4 |
| 2012/0296727 A1* | 11/2012 | Gore | ....................... | G06Q 30/02 |
| | | | | 705/14.27 |
| 2013/0005414 A1* | 1/2013 | Bindra | ................... | B60R 25/25 |
| | | | | 455/575.9 |
| 2013/0332004 A1* | 12/2013 | Gompert | ................ | G07C 5/008 |
| | | | | 701/1 |
| 2013/0345896 A1* | 12/2013 | Blumer | .............. | G06K 9/00624 |
| | | | | 701/1 |
| 2014/0095305 A1* | 4/2014 | Armitage | ........... | G06Q 30/0251 |
| | | | | 705/14.49 |
| 2014/0200760 A1 | 7/2014 | Kaufmann et al. | | |
| 2014/0244399 A1* | 8/2014 | Orduna | ............. | G06F 17/30696 |
| | | | | 705/14.66 |
| 2015/0081404 A1* | 3/2015 | Basir | ................. | G06Q 30/0207 |
| | | | | 705/14.1 |
| 2015/0206206 A1* | 7/2015 | Puente | ............... | G06Q 30/0645 |
| | | | | 705/307 |
| 2015/0242969 A1* | 8/2015 | Pallas | ................... | G06Q 50/06 |
| | | | | 705/39 |
| 2015/0302667 A1* | 10/2015 | Punjabi | .................. | G07C 5/008 |
| | | | | 701/31.4 |
| 2015/0317842 A1* | 11/2015 | Evans | .................. | G06Q 20/325 |
| | | | | 705/13 |
| 2015/0348058 A1* | 12/2015 | Liu | .................... | G06Q 30/0251 |
| | | | | 705/14.49 |
| 2016/0129309 A1 | 5/2016 | Ellis | | |

FOREIGN PATENT DOCUMENTS

| | | |
|---|---|---|
| WO | 2012/163862 A1 | 12/2012 |
| WO | 2012/163863 A1 | 12/2012 |
| WO | 2014/069744 A1 | 5/2014 |

OTHER PUBLICATIONS http://www.telematrix.com/web/en/platform, "Platform Telematics Services, Fleet Management Services, Anti-Theft," May 12, 2014, pp. 1-2.

http://www.mobile-devices.com/our-products/c-4-obd2-dongle, "C4 OBD2 Dongle—The First Entirely Programmable OBD2 Solution," May 12, 2014, pp. 1-2.

https://environcar.org/about.php, "EnviroCar & Citizen Science," May 12, 2014, pp. 1-3.

* cited by examiner

OBTAINING AND USING VEHICLE RELATED DATA

CROSS REFERENCE TO RELATED APPLICATION

This application claims the benefit of priority to U.S. provisional patent application No. 62/018,904 filed Jun. 30, 2014, the entire disclosure of which is incorporated herein by reference.

BACKGROUND OF THE INVENTION

The present disclosure relates to the field of obtaining and using vehicle related data. Vehicle related data may include, but is not limited to, information regarding a location of a vehicle, information regarding a mobility status of the vehicle, information obtained from an on-board diagnosis system of the vehicle, and/or information obtained from a monitoring system of a vehicle.

In recent years, providing location-based services has received increasing attention. This pertains, inter alia, to services that are based on the location of a vehicle, or on other vehicle related data. For example, US 2014/0200760 A1 teaches a method for vehicle communication via a vehicle diagnosis system, wherein vehicle diagnosis data from a vehicle is transmitted from the vehicle diagnosis system to a mobile user communication terminal via an air interface, and the data is further transmitted from the mobile user communication terminal to a data network system via a communication network. As an application example, a personal filling assistant may be implemented, which indicates to the driver preferred filling stations close to the current local position. A filling station can send the driver special offers, advertising, and the like.

A need exists to further develop services, processes, products, devices, apparatus and systems for obtaining and using vehicle related data.

BRIEF DESCRIPTION OF THE DRAWINGS

The following aspects of the disclosure will become more readily appreciated as the same become better understood by reference to the following detailed description, when taken in conjunction with the accompanying drawing figures.

DETAILED DESCRIPTION OF EXEMPLARY EMBODIMENTS

Overview

Figure 1:
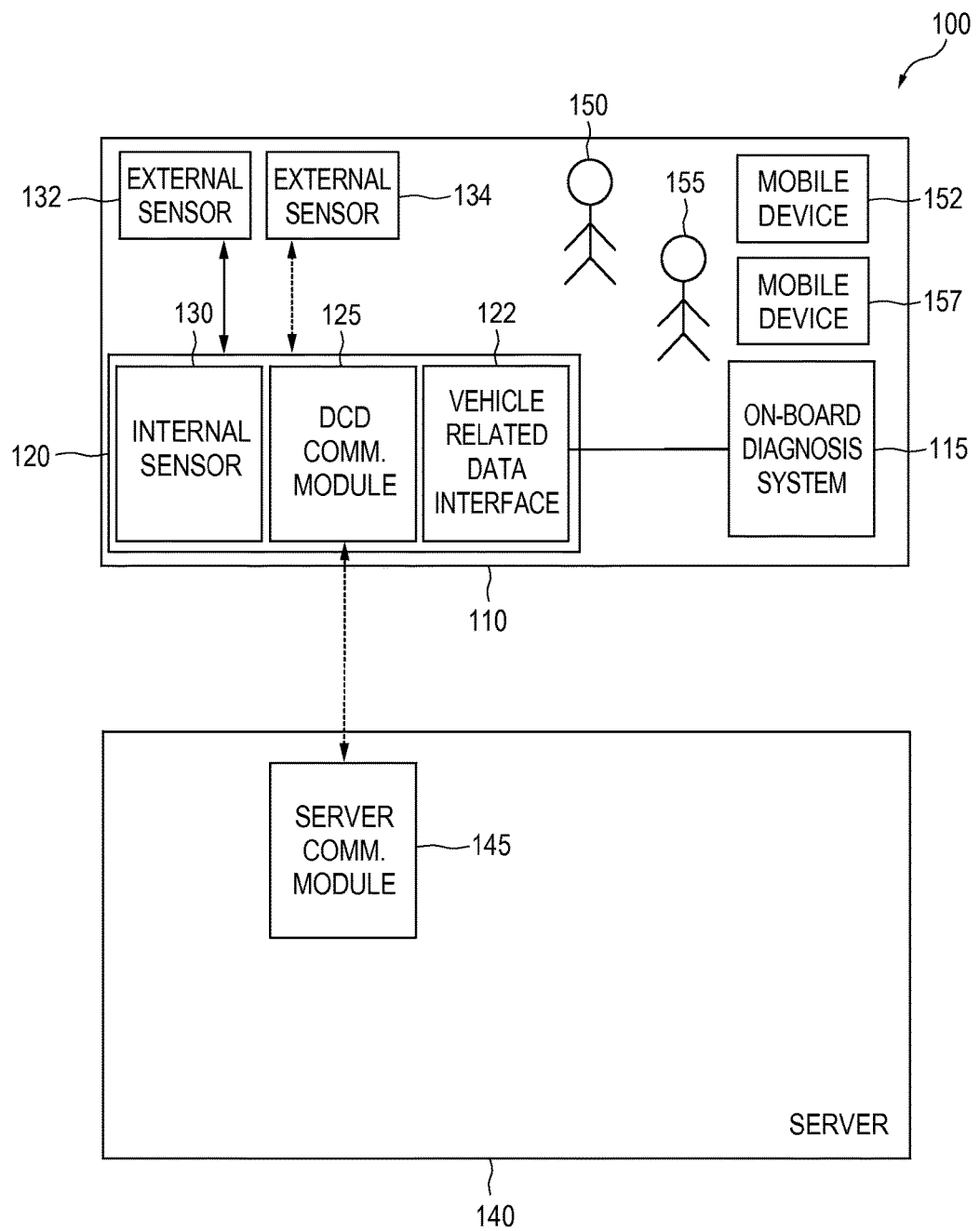
FIG. 1 illustrates a hardware overview of a system comprising at least one vehicle equipped with a data collection device and a server, according to an embodiment of the present disclosure.

The systems, methods, and devices described herein each have several aspects, no single one of which is solely responsible for its desirable attributes. Without limiting the scope of this disclosure, several non-limiting features will now be discussed.

The present disclosure in one aspect relates to a bonus and/or reward system that compensates a user for granting access to vehicle related data. Specifically, an aspect of the present disclosure concerns the idea of equipping a vehicle with a data collection device that collects vehicle related data. The collected data, or parts thereof, is transmitted to a server. The server, also referred to as "geomarketing server", is configured to analyze the received vehicle related data for marketing purposes. From the received vehicle related data, the server is at least capable of determining a location of the vehicle (e.g., longitude and latitude, or any other reference to a location such as an address or an identification code), and/or a mobility status of the vehicle (e.g., "parking", "driving" or "towing"). In some embodiments, the server may estimate a mobility status that is likely to change in the near future (e.g., the mobility status "preparing to park" in the transition from driving to parking, or "preparing to drive" in the transition from parking to driving). In some embodiments, the vehicle related data comprises data about devices or persons in or around the vehicle. As a reward for granting access to at least part of the collected vehicle related data, a customer owning or using a vehicle equipped with a data collection device may receive rewards (e.g., by earning a bonus that is credited to and accumulated in a bonus account, wherein the customer may obtain the reward be spending the bonus, or by directly receiving a reward).

The location may be determined by a receiver of a satellite navigation system, e.g., a Global Positioning System (GPS) receiver, which outputs position data that are accessible to the data collection device. Vehicle related parameters may include one or more of the current speed, the amount of available fuel, the status of the ignition system, locking and unlocking of doors, the number of passengers, seat position, and so on. The data corresponding to vehicle related parameters may be obtained from the vehicle via a diagnosis or control port, e.g., an OBD, OBD2, or EOBD port. The vehicle related data may be transmitted via a communications module, which may use, e.g., Global System for Mobile Communications (GSM), Universal Mobile Telecommunications System (UMTS), or Long-Term Evolution (LTE) networks. Alternatively, vehicle related data may be transmitted via a Wireless Local Area Network (WLAN) or a Bluetooth device or other near field communication in proximity to the vehicle.

In some embodiments, the data collection device sends the collected vehicle related data in real-time to the geomarketing server. In other embodiments, the data collection device determines the present time, generates a time stamp and buffers the collected vehicle related data together with the time stamp. The vehicle related data is transmitted to the geomarketing server in regular intervals or as soon as data communication is possible. In yet other embodiments, vehicle related data is transferred based on predefined events, e.g., when the vehicle is in a certain location or has stopped for a certain amount of time.

In some embodiments, the data collection device and the vehicle are securely paired to ensure that the data collection device may not be removed or decoupled from the vehicle and used in another vehicle. In one embodiment, the vehicle has an integrated functionality equivalent to an retrofitted data collection device. All embodiments may use data collection devices that are retrofitted into the vehicle, as well as data collection devices that are factory-installed and thus are an integrated part of the vehicle.

In some embodiments, the data collection device may determine the current time based on time information provided by the satellite navigation system, or based on time information obtained from the vehicle, or based on a clock that is internal to the collection device.

In some embodiments, the geomarketing server processes the received vehicle related data and determines data patterns for each vehicle, such as, for example, time and location patterns. By analyzing the vehicle related data, the geomarketing server is able to determine a mobility status of the vehicle, e.g., whether the vehicle, with a high degree of certainty, is currently in a state of "parking" or "driving". Further states may be distinguished. In some embodiments, the vehicle is considered as currently in the state of "driving" when the vehicle is moving or making a short stop, such as at a red traffic light. The geomarketing server may determine the mobility status based on the status of the ignition system and/or the current vehicle speed and/or map information and/or a (changing) number of passengers detected in the vehicle.

The geomarketing server may also determine a need for fuel, service and/or repair of the vehicle by analyzing the vehicle related data, e.g., a condition that the fuel is below a certain limit, the presence of error codes, and so on.

The geomarketing server may correlate parking locations or travel routes of the vehicle with business entities and their products and services in a defined vicinity. Business entities may apply to be shown or recommended to users and passengers in correlation with the location received from a data collection device. Business entities may register their products and services at the geomarketing server.

Users of a vehicle equipped with the data collection device may register at the geomarketing server. Upon user registration, an identifier uniquely identifying the data collection device is assigned to the user. Drivers of the vehicle may automatically be registered as users upon purchasing or renting the vehicle. A user may receive a reward or may become a member of a loyalty scheme upon registration. For example, one kind of reward may be a credit at certain gas stations.

In some embodiments, a user may earn a bonus for at least one of (i) registering at the geomarketing server, (ii) connecting a data collection device to a vehicle, (iii) keeping a data collection device connected to the vehicle for at least a certain time interval, and (iv) driving a certain distance. The bonus may be calculated in any units such as, for example, bonus points or bonus miles. The bonus may also be calculated in a currency. For example, one bonus point may be awarded for each kilometer or each mile driven. Any earned bonus may be credited to a bonus account associated with the user. The user may redeem some or all of the accumulated bonus on the bonus account for a certain reward selected from a list of rewards. In other embodiments, the user may directly receive a certain reward or may select a reward from a list of rewards instead of earning a bonus and crediting the bonus to the bonus account.

In some embodiments, a reward may be the purchase of $CO_2$ emission certificates. For example, upon driving the vehicle with a registered data collection device, the $CO_2$ emission caused by driving the vehicle determined from the received vehicle related data may be partially or fully compensated.

In some embodiments, any person, not only drivers of vehicles with a data collection device, may register at the geomarketing server as passengers of vehicles equipped with a data collection device. This registration may be independent from an assigned data collection device. Passengers of a vehicle may be detected by data collection devices through a detected mobile communication device assigned to the registered passenger. Similarly, a bonus may be awarded to at least one of the driver and the passenger when a passenger is detected by the data collection device.

The geomarketing server may assign the vehicle related data received from the data collection device to a data collection device identification number corresponding to a unique data collection device. Alternatively, the received vehicle related data may be assigned to the vehicle to which the data collection device is connected. The vehicle may be identified by a set of vehicle related parameters from which a vehicle fingerprint is generated. In some embodiments, the vehicle is identified by a unique vehicle identification number retrieved by the data collection device. In other embodiments, the received vehicle related data is assigned to the registered user.

The geomarketing server may communicate with users by any means, such as, for example, via email, SMS, MMS, push notifications, chat messages, smartphone applications, and computer programs. In some embodiments, the vehicle is equipped with a communication device which allows the geomarketing server to communicate with a user in the vehicle such as by playing a sound or activating a buzzer. In some embodiments, the geomarketing server is adapted to communicate with an application that executes on a computer apparatus built into the vehicle, such as, for example, a navigation system integrated into the vehicle.

In some embodiments, the geomarketing server informs users and passengers about business entities and/or their products and services in the vicinity of a parking location or the current location of the vehicle or a location where the vehicle can be expected to drive by in the future.

The geomarketing server may determine a location score for parking locations and driving-by locations based on the frequency at which these locations are visited within a given period of time.

The geomarketing server may suggest business entities to a user or passenger based on a certain minimum location score when correlating parking locations and driving-by locations with business entities. Business entities may apply to be listed for a certain location score. Users may rate business entities and/or products and services resulting in a certain business score.

In some embodiments, the geomarketing server establishes user preferences based on the determined locations and/or vehicle related parameters. Users and passengers may also give feedback to the geomarketing server. This feedback may be used to enhance the accuracy or expressiveness of the user preferences. In some embodiments, the vehicle is equipped with a voice communication device. Based on speech recognition, the geomarketing server may determine user preferences for certain products and services.

In some embodiments, the geomarketing server determines business entities and their products and services that match given correlation criteria. For example, the correlation criteria may include any of vicinity, location score, business score, and/or user preferences. The geomarketing server may select a reward issued by a business entity based on any of these criteria.

The geomarketing server may suggest to the user alternative products or services or alternative business entities in a given vicinity. The geomarketing server may also suggest products or services from more distant business entities that have a particularly high business score or provide a certain reward.

In further embodiments, the geomarketing server may assist a driver to find a parking lot. The geomarketing server is aware of parking lots based on map information. The geomarketing server may be aware of the occupation status of a parking lot based on information received from a parking lot management system and/or from other vehicles equipped with the data collection device. Based on this information, the geomarketing server may guide a driver to an available parking lot. The geomarketing server may also be aware of an expected change from parking to driving of a particular vehicle with a high degree of certainty by analyzing status changes in vehicle related data, such as by detecting the unlocking of a door in a parked vehicle or by detecting that the lights have just been turned on. Thus, the geomarketing server could direct a driver to a presently still occupied individual parking space which is expected to become free in the near future.

In yet further embodiments, a geomarketing server that is aware of parking lots or individual parking spaces based on location information may automatically charge a parking fee if the geomarketing server detects vehicle related data that refer to parking on a location marked as chargeable. The geomarketing server may communicate with a management system of a public or private entity to signal that the parking fee has been paid or will be paid. This information may be available to parking attendants so that the vehicle owner does not need to obtain and display any proof of payment.

The described embodiments may be combined: Instead of charging a parking fee, free or reduced-fee parking may be offered as a reward. Similarly, the service of directing a driver towards a free parking lot or individual parking space may also be offered as a reward, or may be charged to the driver.

In some embodiments, the geomarketing server provides a merchant interface to provide payment features. A user may purchase a product or service at a registered business entity. The user's agreement with the purchase may be implied by the detection of a vehicle within a defined area, the vehicle having a data collection device associated with the user, optionally with an explicit confirmation by the user. The purchased product or service is billed to an account associated with the user managed at the geomarketing server. The user may clear the balance by making a payment to the geomarketing service provider. In some embodiments, the balance is at least partially cleared by redeeming previously earned bonus points.

In one embodiment, a gas station offers automatic payment upon identifying a user via the geomarketing server that detected a vehicle with a corresponding data collection device located at the premises of the gas station.

In still another embodiment, the geomarketing server provides a driver's log to the registered user which may be, e.g., used for furnishing to financial authorities.

In some embodiments, the data collection device may be configured to control which kind of the collected vehicle related data is transferred to the geomarketing server or which of the vehicle related data is collected at all. The data collection device may be configured to temporarily prohibit the collecting of certain vehicle related data or the transferring of collected vehicle related data to the geomarketing server (privacy mode). The data collection device may further be configured to provide fuzzy location information and/or vehicle related data with a defined degree of inaccuracy. The data collection device may be configured to restrict the transmission of location information and/or vehicle related data to those points in time when changing between a parking state and a driving state, so that the geomarketing server is only aware of the start point and the end point of a route but not about the driven route in between.

In some embodiments, the geomarketing server has an application layer allowing, e.g., third parties to analyze the received vehicle related data in applications. The user may subscribe to one or more applications. Some applications may be mandatory, some applications may be optional. The registered user may earn bonus points or receive rewards upon subscribing to an application and/or for remaining a subscriber over a certain period of time. The registered user may also request release of a reward to another person. Registered passengers may earn a bonus for allowing to track the location of their mobile communication device.

In some embodiments, the third parties gaining access to the processed vehicle related data at the geomarketing server will make a payment to the geomarketing service provider for receiving access to the received vehicle related data. Part or all of this payment may be in the form of rewards that the geomarketing service provider may then hand out to its registered users and passengers.

The application layer may restrict the access to collected location information and vehicle related data, thereby granting application specific access only to required vehicle related data. In some embodiments, the application specific accessing of data results in an application specific configuration of the data collection device so that the data collection device transmits only those parts of the vehicle related data to the geomarketing server or collects only those parts of the vehicle related data which are relevant for subscribed applications and for mandatory applications.

In some embodiments, applications that determine which vehicles are located within a certain vicinity will not gain access to the location of the matching vehicles, or will receive location information only with a certain "fuzziness" or inaccuracy.

Aspects of the Disclosure

The present disclosure includes, but is not limited to, four major aspects:

According to a first aspect of the disclosure, vehicle related data of at least one vehicle is received and analyzed for marketing purposes. The vehicle related data may comprise information about the location of the vehicle over time. The processing of vehicle related data may, in some embodiments, result in a vehicle-specific database, e.g., a vehicle-specific location database when retrieving and storing the location of the vehicle over time. For granting access to at least a part of the collected vehicle related data, a user or owner of the vehicle receives a reward, e.g. by crediting a bonus to a bonus account.

According to a second aspect of the disclosure, a user action performed in or around the vehicle that is reflected in the data collected by the data collection device may be the trigger for initiating a task at the geomarketing server. A user action may be a short activation, e.g., for up to 1 or 2 seconds, of a vehicle function or pattern of various vehicle functions in combination or in sequence, such as the activation of a windshield wiper and subsequent deactivation within an interval of at most 5 seconds. Such a user action may be linked with at least one location, e.g., an entrance gate to a parking deck. When detecting a user action at a location linked to the user action, a server-side task is initiated, e.g., effecting a payment, or spending some bonus from the user's bonus account to receive a reward.

According to a third aspect of the disclosure, a mobility status of the vehicle is determined or at least estimated by analyzing the received vehicle related data. The mobility status (e.g., a distinction between at least "driving" and "parking", and possibly further values), greatly improves the significance of a vehicle-specific database. In one embodiment, the mobility status is determined only based on location information. Based on an ex-post analysis of location information over time, single destination points of the routes of the vehicle can be determined. This is achieved by detecting a stopped vehicle based on an essentially unchanged location for a longer time interval than a parking threshold time and, optionally, by mapping the location of the vehicle to map information to distinguish a vehicle stop due to traffic conditions from parking. In other embodiments, the mobility status may be is determined by considering vehicle related data beyond location information. This is advantageous when determining single destination points of the vehicle without the need of an ex-post analysis of location information as discussed above. By analyzing further vehicle related data, it can be assumed, e.g., that the vehicle is parked even before the expiry of the parking threshold time. If, in one example, the engine of the vehicle is shut off and a door of the vehicle has been opened and closed again or has been locked after opening and closing, it can be assumed without any delay that the vehicle is parked. By analyzing vehicle related data, the mobility status, e.g. "parking" or "driving", may be determined without any significant delay. Furthermore, expected changes of the mobility status may be estimated prior to a change. For example, when unlocking a door of a parked vehicle, it can be assumed that the vehicle will start moving in the new future. Such an estimated mobility status—a mobility status signaling the expectation that a parking space will soon become free—may function as a trigger for offered services.

According to a fourth aspect of the disclosure, the data collection device limits the access of the server to the collected vehicle related data. For example, the data collection device may restrict the collection or storage of vehicle related data to only those data elements that the server is allowed to receive, or the data collection device may transmit only that part of the collected vehicle related data that the server is allowed to receive. This permits a user to define which kind of vehicle related data may be handed over to the server, thus improving privacy. A further advantage is that the data traffic volume can be reduced, as less data needs to be transmitted. In some embodiments, vehicle related data collected by the data collection device is transmitted to the server with a lower degree of accuracy. Data may be "blurred", e.g., an inaccuracy may be added to the collected data so as to hide the exact location of the vehicle. This approach further reduces the amount of vehicle related data to be transmitted to the server and improves privacy, as the server will only be informed about trends or rough positions, but not about exact values of certain parameters.

Definitions

In order to facilitate the understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Geomarketing Server

The term "geomarketing server" includes any server system with one or more computing devices for processing information received from a plurality of data collection devices. The geomarketing server may have further functions, such as, for example, configuring the data collection devices or providing user interfaces over the Internet or a mobile communications network. Users of the geomarketing server may be vehicle users and/or interested parties that are allowed to access the collected data for marketing purposes.

On-Board Diagnostics System

The term "on-board diagnostics system" or "on-board diagnosis system" includes any system implemented in a vehicle to provide at least diagnostic information. The on-board diagnostics system may further provide access to one or more bus systems of the vehicle that control vehicle functions beyond diagnostic information. The on-board diagnostics system comprises an on-board diagnostic port as a physical interface or a wired connection point or a wireless link. The on-board diagnostics systems known in the art include OBD, OBD II, EOBD, SAE, other OBD systems, engine control modules, vehicle-mounted GPS systems, integrated GPS systems, computer components of vehicles, computer systems, sensors or any other apparatus or systems known in the art capable of measuring, sensing or transmitting data about the state of a vehicle or its component parts.

Data Collection Device

The term "data collection device" refers to both an external (e.g., retrofitted) entity that is installed in a vehicle, and an integrated (e.g., factory-installed) part of the vehicle. The data collection device is coupled to the on-board diagnostic system for collecting vehicle related data accessible to the on-board diagnostic system or to sensors coupled to the data collection device.

Vehicle Related Data

The term "vehicle related data" encompasses all data that is collected by the data collection device and transmitted to the geomarketing server. Vehicle related data comprises diagnostic data and status or status change information of vehicle components obtained from the on-board diagnostic system, including, but not limited to, information about the location of the vehicle, information about the opening or closing of doors, seat positions, vehicle speed, and status of the ignition system. Vehicle related data further comprises, but is not limited to, data obtained from sensors that are part of the data collection device or that are connected to the data collection device. Vehicle related data also encompasses data relevant for detecting persons and devices in or around the vehicle.

User

The term "user" refers to a person that is registered at the server and has an associated data collection device. Typically, personal details of a registered user are known. If the recorded details include an identification of mobile communication devices associated with the user, the data collection device may detect the presence of the user in or around the vehicle through the detected mobile communication device associated with the user.

Passenger

The term "passenger" refers to the persons in a vehicle and includes, but is not limited to, the driver of the vehicle.

The data collection device may detect a passenger in or around the vehicle by a sensor or via a mobile communications device that is associated with the passenger. As long as a passenger is not registered at the server, the server may at least determine a unique identification of detected mobile communications devices, thereby creating a location profile of mobile communications devices travelling together. As a user may be a driver of the vehicle, a user located in or around the vehicle may also be designated by the term "passenger". In this respect, the terms "user" and "passenger" are interchangeably used. The term "registered passenger" refers to a passenger who has been registered at the server. A registered passenger may be identified through an associated mobile communications device.

Mobile Communications Device

The term "mobile communications device" includes any communications device, such as a cell phone, smartphone, pager, laptop, messaging device, e-mail device, text transmission device, personal digital assistant (PDA) device, configured to send, receive, store or otherwise utilize data, audio, or visual communication over a network.

Location

The term "location" refers to any type of information from which a location may be determined. Such information comprises, but is not limited to, position data identifying longitude and latitude; any address referring to a location (e.g., a street address, a postal address); or any kind of information identifying an entity located at a certain position (e.g., a company name and/or a designation of a branch).

Mobility Status

The term "mobility status" refers to the motion status of a vehicle determined from data of an on-board diagnosis system of the vehicle or sensors in or around the vehicle. The mobility status may, for example, indicate whether the vehicle is in operation (mobility status="driving") or whether it is parked (mobility status="parking"). The mobility status of "parking" may, in some embodiments, be distinguished from a (short) stop, e.g., because of a red traffic light or a stop because of a traffic jam. In some embodiments, the mobility status may indicate expected changes of the motion status of the vehicle. For example, the mobility status "preparing to drive" may express an expected change from "parking" to "driving", wherein the expected change is derived from an analysis of collected vehicle and sensor data.

Bonus

The term "bonus" designates any kind of reward or any currency that may be used for obtaining rewards. A "bonus" may be measured in any units such as, for example, bonus points or bonus miles. In many embodiments, a bonus is earned as a compensation for allowing the gathering of vehicle related date and the transmission of this data to the geomarketing server. Alternatively or additionally, a user may earn a bonus by performing a certain task or action. The earned bonus may be credited to a bonus account. In some embodiments, a user may choose from existing loyalty schemes so that, e.g., the earned bonus is credited to an existing bonus account of a certain loyalty scheme to which the user is already registered. In some embodiments, the bonus is measured in a currency. When crediting a bonus to a bank account or credit card account or any other type of monetary account, the distinction between "bonus" and "reward" gets lost. In these embodiments, the terms "bonus" and "reward" may be interchangeably used.

Reward

The term "reward" refers to any kind of benefit that is offered to a user. In some embodiments, the offered reward is an incentive for the user to grant access to vehicle related data of the vehicle that is driven by the user. In other embodiments, the offered reward is an incentive for the user to allow his or her identification through a data collection device so that at least one of the corresponding vehicle, the location of the user, and the person or persons accompanying the user can be tracked. A reward may also be offered to a third party upon request of the user that qualified for receiving the reward. A reward may also be a benefit for the general good or a donation to a nonprofit organization. The offered reward may comprise goods, services, securities, stocks, bonds, funds, and bonus for a bonus account of another loyalty scheme. A reward may be the purchase of $CO_2$ certificates to compensate, either partially or in full, for the $CO_2$ emission caused by the vehicle that has been used by the user.

Bonus Account

A bonus account is an account for accumulating earned bonus. The balance of the bonus account reflects the total accumulated amount of bonus that may be spent for receiving rewards. A reward generally costs a certain amount of bonus that will be deducted from the bonus account. A bonus account is created for a data collection device or for a user. A bonus account may be shared by a plurality of data collection devices or by a plurality of users. In some embodiments, there is no separate bonus calculation and bonus account. In these embodiments, rewards are offered without any accumulation on a bonus account.

Description of the Figures

The disclosure is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

FIG. 1 shows a hardware overview 100 of a geomarketing system for the purpose of collecting and analyzing information related to a location and/or a mobility status of vehicles (only one vehicle 110 is shown in FIG. 1) and their drivers (in the example shown in FIG. 1, a user 150) and passengers 155.

The vehicle 110 comprises an on-board-diagnosis system 115 that is capable of providing data about the state of the vehicle 110. The provided data is referred to as "vehicle related data" 520. A data collection device 120 is coupled to the on-board diagnosis system 115 via an interface for vehicle related data (a "vehicle related data interface" 122). In one embodiment, the on-board diagnosis system 115 is accessible via a socket in the vehicle 110 which is physically connected to a plug of the vehicle related data interface 122 of the data collection device 120. In other embodiments, the vehicle related data interface 122 may be external to the data collection device 120 and coupled to the data collection device 120 by either a wired or a wireless connection.

The data collection device 120 is configured to collect vehicle related data provided by the on-board diagnosis system 115. In some embodiments, the data collection device 120 may also collect vehicle related data from one or more sensors, e.g., from a sensor 130 that is internal to the data collection device 120, from an external sensor 132 that is wired to the data collection device 120, or from an external sensor 134 that communicates wirelessly with the data collection device 120. In one embodiment, such a sensor 130, 132, 134 may comprise a receiver for signals of a satellite navigation system, e.g. GPS. This is advantageous if location information cannot be obtained from the on-board diagnosis system 115, or if the accuracy of the location information obtained by the on-board diagnosis system 115 is insufficient. In some embodiments, sensors of mobile communication devices 152, 157 in or around the vehicle 120 may also be accessed by the data collection device 120 to collect vehicle related data therefrom. Consequently, the term "vehicle related data" is not limited to data exclusively related to the vehicle 110. The vehicle related data comprises all data that is collected by the data collection device 120, including data about persons 150, 155 and devices 152, 157 in or around the vehicle 110.

The data collection device 120 further comprises a data collection device communication module 125 to transmit at least a part of the collected vehicle related data to a server communication module 145 that is coupled to a server 140. The server 140 analyses the vehicle related data and stores it in a database. In some embodiments, the server communication module 145 may be external to the server 140. In some embodiments, the communication between the data collection device 120 and the server 140 is routed over the Internet. The data collection device communication module 125 may comprise a wireless modem 126 to establish mobile Internet access via a mobile network operator or may request Internet access via a mobile communication device 152, 157 in vicinity of the vehicle 110.

The data collection device communication module 125 supports bi-directional communication in order to send the vehicle related data to the server 140 and to receive configuration or administration commands. In some embodiments, configuration or administration commands are sent from the server 140. In other embodiments, configuration or administration commands are sent from a user device 152 without involving the server 140. In yet another embodiment, it is determined which configuration or administration command coming from the server 140, from the user device 152, or from both will be accepted.

In some embodiments, the data collection device 120 may be configured to define which vehicle related data of corresponding vehicle related parameters is to be retrieved from the on-board diagnosis system 115 over the vehicle related data interface 122, or from sensors 130, 132, 134 coupled to the data collection device 120. This advantageous concept results in reduced bandwidth requirements as vehicle related data that is not monitored is not even transferred to the data collection device 120. It further results in increased data privacy as the user 150 may decide which vehicle related data 520 is to be collected. In some embodiments, the server 140 may configure the data collection device 120 which portion of the collected vehicle related data 520 needs to be transmitted to the server 140. For example, this configuration may be made depending on an application or a plurality of applications executed at the server 140. If an application executed at the server 140 does not require certain vehicle related data, this vehicle related data does not need to be collected or, if it is collected, does not need to be transmitted to the server 140.

In some embodiments, the data collection device 120 provides a user interface directly accessible to the user without involving the server 140. The user interface may provide access to all collected vehicle related data. The user 150 may define which part of the collected vehicle related data is accessible to the server 140. In other embodiments, configuration and administration tasks are performed by means of a user interface of the server 140. In such embodiments, the server 140 sends requests to the user of the data collection device 120, wherein the requests regard the configuration and administration of the data collection device 120.

Usually, the vehicle related data is collected in regular time intervals and a timestamp may be generated to link the collected vehicle related data to the respective points of time to which each portion of the collected vehicle related data belongs. For example, vehicle related data may be collected each second, each 5 seconds, each 10 seconds, each 15 seconds, each 30 seconds, each minute, each 2 minutes, each 5 minutes, or each 10 minutes. In some embodiments, vehicle related data is only collected if there is at least one change in the collected vehicle related data as compared to the previous set of collected vehicle related data.

In other embodiments, a certain value or certain value ranges of determined parameters or changes of such values within a certain period of time are used as a trigger for setting an appropriate data collection time interval. For instance, the data collection time interval may be adjusted depending on the vehicle speed obtained from the on-board diagnosis system 122. The higher the vehicle speed, the shorter the data collection time interval. The data collection time intervals may also be adjusted based on detected location changes, in order to ensure that the data is collected at time intervals that ensure detection of location changes within a determined distance as compared to the location at the previous point of time where data was collected. The data collection may also be triggered by the on-board diagnosis system 115 or by one of the sensors 130, 132, 134 based on configurable events. Such an event may be the detection of a certain mobile communication device 152, 157 in the vicinity of the vehicle 110.

The collected vehicle related data is buffered in the data collection device 120, and at least part of the collected vehicle related data is transmitted to the server 140 in certain time intervals. In some embodiments, the vehicle related data is sent immediately after collection. In other embodiments, the data collection time interval differs from the data transmission time interval. Both types of time intervals, or only one of them, or none, may be regular time intervals. In case of irregular data transmission intervals or if no vehicle related data needs to be transmitted, the data collection device 120 may send a keep-alive message to the server 140. If transmission fails, e.g., due to temporary failure of the network or if there is no network at the current location, the data collection device 120 will buffer the collected vehicle related data and will try to re-send the vehicle related data in subsequent data transmission time intervals.

In some embodiments, the transmitted vehicle related data only contains those parts of the collected vehicle related data that has changed since the last retrieval of data. This saves data traffic, as the irrelevant unchanged parts of collected vehicle related data is not sent to the server 140.

Figure 2:
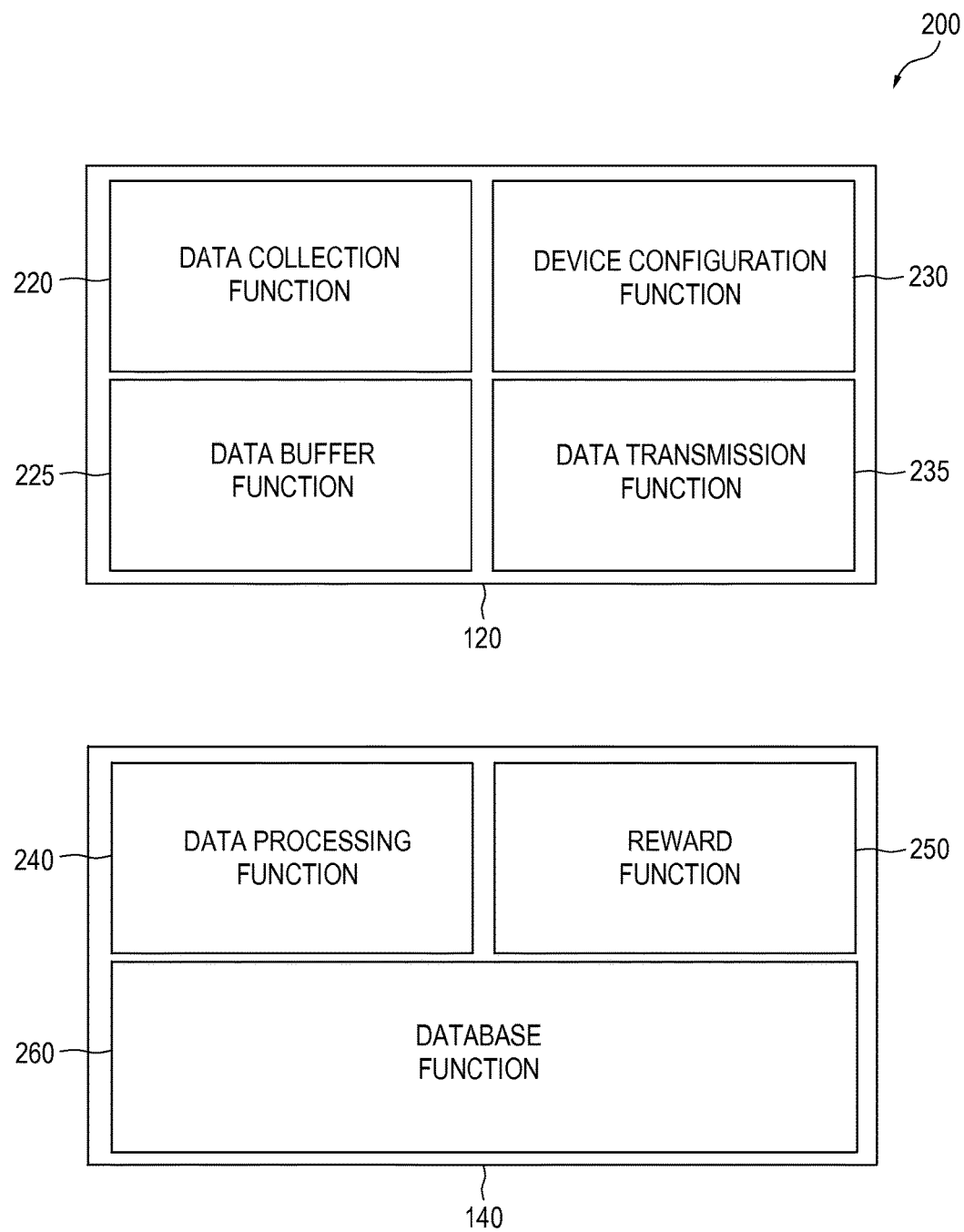
FIG. 2 illustrates a logical overview of the system comprising at least one vehicle data collection device and a server, according to an embodiment of the present disclosure.

FIG. 2 shows a logical overview 200 of the geomarketing system.

In one embodiment, the data collection device 120 comprises four interacting functions:

- a data collection function 220 to collect vehicle related data 520 from the on-board diagnosis system 115, from sensors 130, 132, 134, and from communication modules 127, 128, 129 for detecting mobile communication devices 152, 157 in or around the vehicle 110;
- a data buffer function 225 to buffer the collected vehicle related data at least until transmission to the server 140;
- a data transmission function 230 to send at least a part of the collected vehicle related data, according to user and/or server specific settings and buffered by the data buffer function 225, over a data collection device communications module 125, e.g., one of the modules 126-129, to the server 140; and
- a device configuration and administration function 230 to configure and administrate the data collection device 120, e.g. to define which part of available vehicle related data to collect and which part of the collected vehicle related data 520 to transfer to the server 140.

In one embodiment, the server 140 comprises three interacting functions:

- a data processing function 240 to receive vehicle related data from the data collection device 120 and to process the received vehicle related data for marketing purposes;
- a reward function 250 to determine a bonus and/or reward as compensation for receiving vehicle related data;
- a database function 260 to store the received and processed vehicle related data.

Each of the functions may be implemented by means of a dedicated hardware unit and/or software unit with an interface communicating with the other units. Each of the functions may also be combined with at least another function to be implemented in a combined unit comprising at least two functions. If implemented in software, the combination of software functions in one combined software unit may be different from a grouping of functionality of the underlying hardware.

Figure 3:
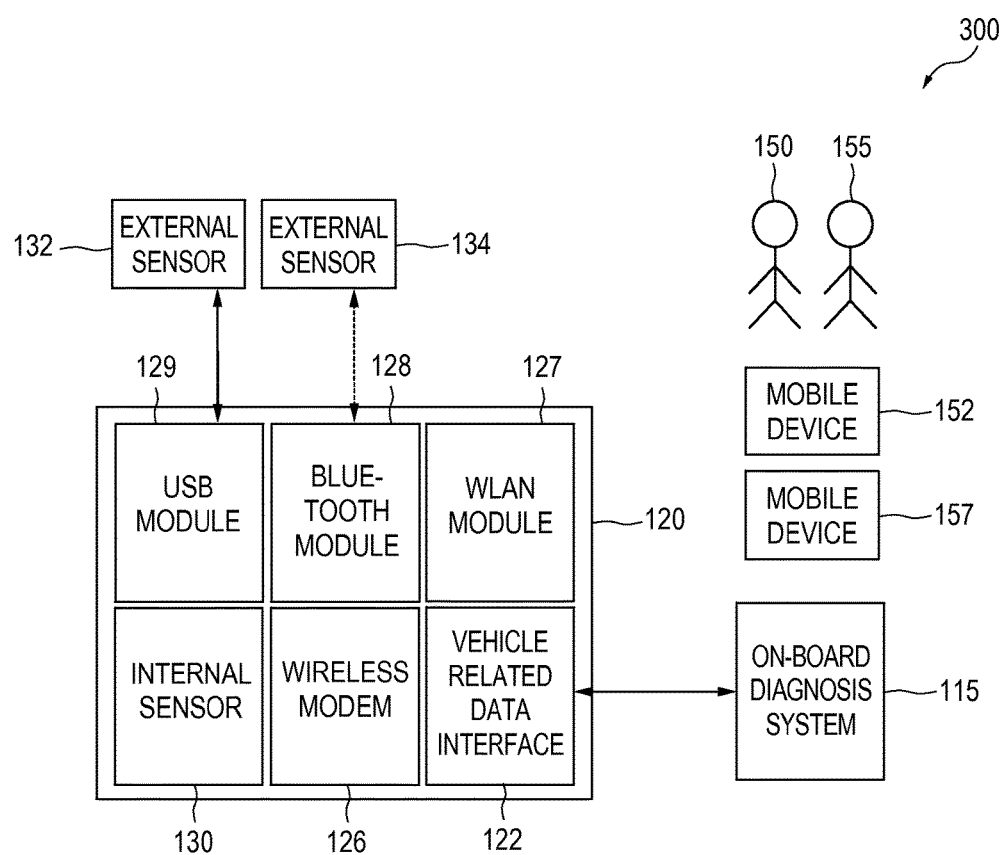
FIG. 3 illustrates the data collection device and its interfaces to external entities, according to an embodiment of the present disclosure.

FIG. 3 shows an example embodiment 300 of the data collection device 120 comprising a plurality of data collection device communication modules 126-129. If one of the data collection device communication modules 126-129 fails to transmit the vehicle related data to the server 140, another one of the data collection device communication module 126-129 may try to send the vehicle related data. In one embodiment, the main communication path to the server 140 is maintained by a wireless modem 126 built into the data collection device 120. If the wireless modem 126 cannot establish a connection with the server 140, the data collection device 120 may make use of its built-in low range wireless connections, e.g., via a WLAN module 127 or a Bluetooth module 128 to a mobile device 152, 157 of a person 150, 155 in or around the vehicle 110. Alternatively, a server connection may be established via a mobile device 152, 157 connected to an USB port 129 of the data connection device 120. In these scenarios, the vehicle related data is sent to the server 140 by using an Internet connection established by the mobile device 152, 157.

Figure 4:
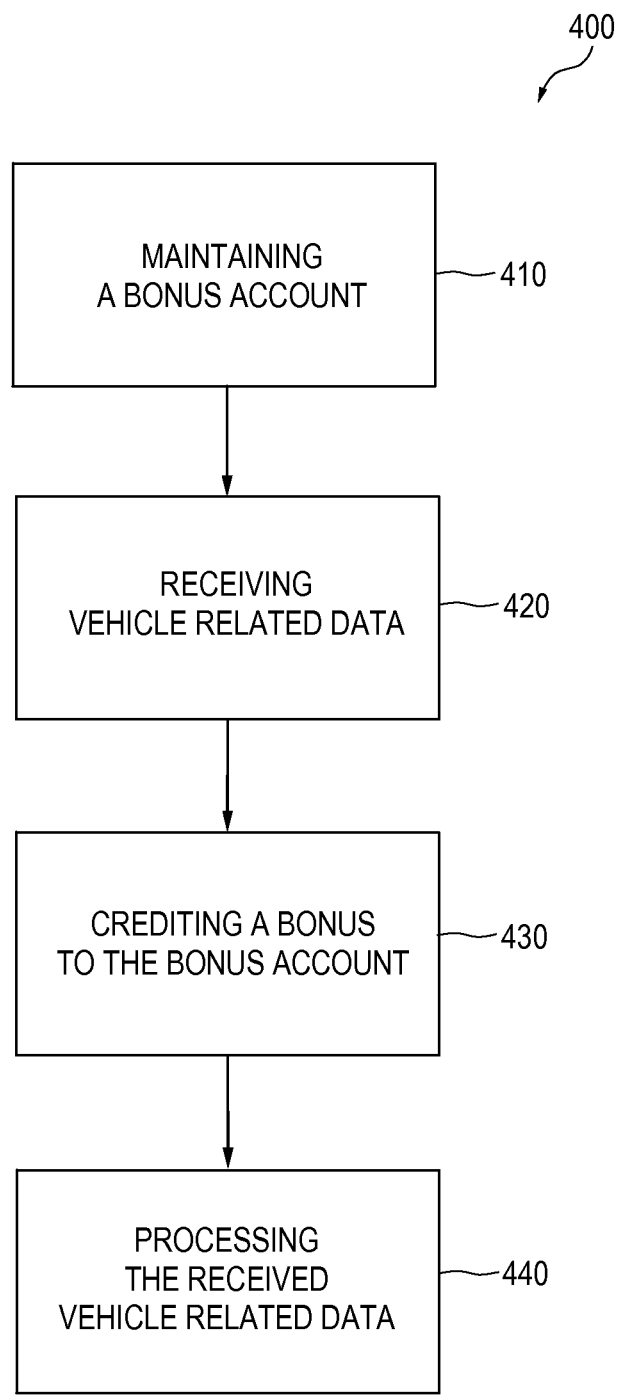
FIG. 4 illustrates a method for offering a bonus, according to an embodiment of the present disclosure.

FIG. 4 illustrates a sample method for offering a bonus. The bonus is offered as incentive for allowing the processing of the received vehicle related data. In a preparation step 410, a bonus account is maintained. The bonus account accumulates all the bonuses credited to the bonus account. In one embodiment, the bonus account is associated with one or more data collection devices 120. Alternatively or additionally, the bonus account may be associated with one or more users 150 who are entitled to spend bonus from the bonus account to obtain a reward. In other embodiments, there is no bonus accumulation in order to obtain a reward, as the bonus may already be the reward. In such embodiments, the bonus account is an optional feature and only used for tracking purposes of the already offered rewards.

In step 420, the server 140 receives vehicle related data from the data collection device 120. The reception of this data and the permission of the user to process this data are the basis for the offering of the bonus.

In step 430, an amount of bonus is determined and credited to the bonus account 530. In some embodiments, the earned bonus is calculated in regular time intervals, e.g. each 5 minutes, each 10 minutes, each 15 minutes, each 30 minutes, each hour, each day, each week, each month. In other embodiments, the bonus is calculated when an event occurs that triggers a bonus calculation, e.g., a specific location 564 or mobility status 566 or a specific vehicle related data pattern of the vehicle 110 or a specific device 152, 157 or person 150, 155 detected in or around the vehicle 110. In one embodiment, the bonus calculation is triggered each time when the vehicle 110 enters the mobility status of "parking".

The earned bonus may depend on a time interval during which the data collection device 120 collects vehicle related data, e.g., one bonus point per minute, per hour, or per day. In some embodiments, no bonus is earned while the vehicle 110 is parked or not in operation. The earned bonus may depend on the driven distance during which the data collection device 120 collects vehicle related data, e.g., one bonus point per driven mile or kilometer. The earned bonus may depend on the number or importance of different vehicle parameters for which data is collected or transmitted to the server 140. The more insight a user 150 allows to be obtained, the more bonus may be offered, e.g., one bonus point per hour for granting access to the location of the vehicle 110, and another bonus point per hour for granting access to vehicle parameters that allow determining the mobility status of the vehicle 110. The mentioned possibilities of calculating the amount of bonus earned may be combined, e.g., in a linear combination with individually determined weighting factors.

Step 430 of crediting a bonus to the bonus account 530 may also be performed in a post-processing task in regular or irregular time intervals independent from steps 420 and 440 by processing the already received vehicle related data.

In step 440, the received vehicle related data is processed for marketing purposes. The processing of the received vehicle related data will be explained later in the description of FIG. 5.

The purpose of the accumulated bonus on the bonus account is to allow the user or another person to obtain a reward by spending all or part of the bonus, i.e., by deducting some or all bonus from the bonus account. The bonus may be spent by the person to whom the bonus account is assigned to, e.g., usually the user 150, or one of the passengers 155 if the bonus account is assigned to a passenger account of a passenger 155. In some embodiments, the person to whom the bonus account is assigned may choose a reward from a list of rewards, wherein each reward results in a reward specific bonus deduction from the bonus account. The release of a reward may also be triggered automatically, e.g., upon expiry of a time interval or upon occurrence of an event.

Rewards may be related to the vehicle 110, e.g., by a purchase of $CO_2$ certificates to fully or partially compensate the $CO_2$ generated by the vehicle 110 on the routes driven.

The emission may be estimated based on the driven distance and/or calculated from engine parameters extracted from the vehicle related data. In some embodiments, free parking or parking at reduced rates is offered as a reward at metered parking places. Similarly, free fueling or fuel at a reduced rate may be offered as a reward at determined filling stations.

Figure 5:
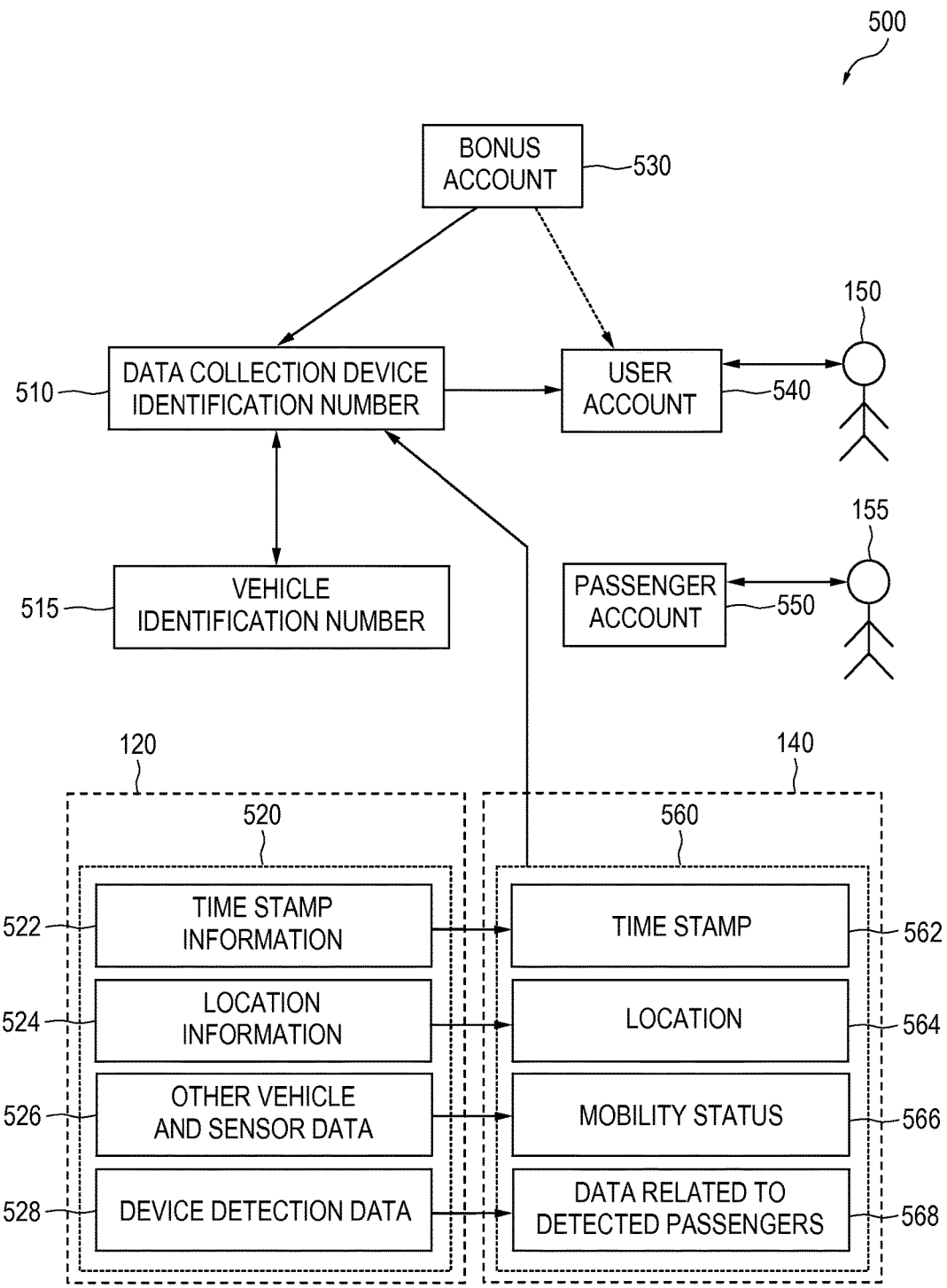
FIG. 5 illustrates a data relationship model of the data involved in the system, according to an embodiment of the present disclosure.

FIG. 5 shows a data relationship model of the data involved in a geomarketing system. In some embodiments, the received vehicle related data 560 comprises information about the location 564 of the vehicle 110. The server 140 determines the location 564 of the vehicle 110 at a corresponding point of time 562 from the received vehicle related data 560. At the server 140, the location 564 at its corresponding point of time 562 is linked to a data collection device identification number 510 that uniquely identifies the data collection device 120. Alternatively or additionally, the location 564 of the vehicle 110 is linked to a vehicle identification number (VIN) 515 contained in the received vehicle related data 560 and retrieved from the on-board diagnosis system 115, thereby creating a vehicle-specific location database that tracks the movement of vehicles 110 over time. In some embodiments, the vehicle-specific database is enriched with further vehicle related data 560 received from data collection devices 120.

The term "vehicle-specific database" includes databases that link vehicle related data 560 to at least one of a vehicle identification number 515, a data collection device identification number 510, a user account 540, and to any other identification that allows the (direct or indirect) identification of a corresponding vehicle 110.

In one embodiment, a customer may purchase or rent or use a vehicle 110 with a pre-installed data collection device 120. Upon agreeing on a sales or rental contract, the personal details of the customer are forwarded to the server 140, stored in a user account 540, and linked to the data collection device identification number 510 of the pre-installed data collection device 120 and/or to the vehicle identification number 515 of the vehicle 110 in which the data collection device 120 has been pre-installed. Consequently, the customer becomes a registered user 150 to whom the user account 540 is assigned.

In another embodiment, a customer or a vehicle driver obtains a data collection device 120 either for free or purchases one for his or her vehicle 110 that has not been equipped so far with a data collection device 120. Upon receipt of the data collection device 120, the customer or vehicle driver is requested to enter his or her personal details, which are forwarded to the server 140, stored in a user account 540, and linked to the data collection device identification number 510 of the data collection device 120 that has been handed over to the customer or vehicle driver. Alternatively, the customer or vehicle driver may register the data collection device 120 over a user interface of the server 140 by entering his or her personal details and information that uniquely identifies the data collection device 120, e.g., the data collection device identification number 510 or any other type of serial number uniquely related to the data collection device identification number 510. In another embodiment, the registration process is performed over a user interface of the data collection device 120 that uses its data collection device communication module 125 to register the user 150 at the server 140. In such an embodiment, there is no need for the customer or vehicle driver to enter a unique identification of the data collection device 120, as the data collection device 120 processes the registration itself and may provide the required unique identification to the server 140.

The personal details that are stored in a user account 540 at the server 140 and linked to the data collection identification number 510 of the corresponding data collection device 120 may comprise at least one of the name of the vehicle driver, the mobile phone number, email address, postal address, place of residence, credit card details, bank details, and any other detail relevant for payment purposes. A customer or vehicle driver having registered the corresponding data collection device 120 is referred to as registered user or simply as user 150.

Beside the registration of customers, e.g., usually the vehicle drivers, with an assigned data collection device 120, any other person may register at the server 140 and enter personal details that are stored in a passenger account 550. Such a registration requires at least information that allows a data collection device 120 to identify the presence of the registered person as passenger 155 of a vehicle 110, e.g., by detecting a device 157 of the passenger 155 in or around the vehicle 110. A registered passenger 155 without any associated data collection device 120 may earn a bonus based on passenger or device 157 detection in or around a vehicle 110, i.e., one or more bonus accounts 530 may also be assigned to a passenger account.

In some embodiments, a user 150 with a regular user account 540 may also earn a bonus when being detected as a passenger 155 in a different vehicle that is also equipped with a data collection device 120. The bonus for passengers 155 may be calculated according to different rules than the bonus for users 150. The detection of passengers 155 in or around the vehicle 110 of an associated user 150 may also affect the bonus calculation of the user 150.

In some embodiments, a user 150 may request the transmission of collected data 520 with a reduced accuracy. For example, the transmitted location information 524 may be modified with a random error, or a fuel level may be transmitted that distinguishes only between "low" and "high". Depending on the user's configuration or on application specific settings of the server 140, vehicle related data 560 with reduced accuracy is transmitted to the server 140. The accuracy may be reduced, for example, by applying a deliberate error to a vehicle related data value and/or by increasing the time intervals after which new vehicle related data is sent to the server.

The purpose of further vehicle related data 560 beyond information about a location 564 of the vehicle 110 transmitted to the server 140 is to enrich a vehicle-specific location database with data 560 related to the vehicle 110, to persons 150, 155 in or around the vehicle 110, and to devices 152, 157 in or around the vehicle 110. By analyzing further vehicle related data, e.g. to determine the mobility status 566 of the vehicle 110 or to determine data 568 related to detected passengers 155 in vehicle 110, the significance of the vehicle-specific location database may be improved.

A mobility status 566 of a vehicle 110 describes whether the vehicle 110 is in motion or not, or whether a status change is likely to happen in the near future. A mobility status 566 may be estimated based on location information 564: If the location 564 is steadily changing within short time intervals, e.g. each second, each 5 seconds, each 10 seconds, each 15 seconds, each 30 seconds, each minute, each 2 minutes, and each 5 minutes, it can be assumed that the vehicle 110 has the mobility status "driving". Similarly, in an ex post analysis, it can be assumed that the vehicle 110 has the mobility status 566 of "parking" if the vehicle does not move, i.e., if there is essentially no change of location 564 over a certain parking time threshold, e.g. 2 minutes, 5 minutes, 10 minutes, or 15 minutes. However, when determining the mobility status 566 simply based on the current location 564, there is a kind of uncertainty that the determined mobility status 566 may be wrong. For example, in case of a traffic jam that causes a stopping of the car beyond the parking time threshold, a mobility status of "parking" may be assumed although the vehicle 110 was not parked. In case of towing the vehicle 110, a mobility status of "driving" may be assumed as the vehicle 110 moves. It would be useful to improve such imprecise estimates.

In an embodiment, the validity of the determined mobility status 566 is improved by correlating additional vehicle related data 560 to the determined location 564, and/or by using vehicle related data 560 instead of the location information 564. A mobility status 566 of "driving" may be determined by analyzing at least one of the vehicle speed, shifting the gears, applying a clutch, and applying the breaks. A mobility status 566 of "towing" may be differentiated from "driving" by two different ways depending on the kind of towing: Towing may be performed by transporting the vehicle 110 on another vehicle. In this case, the ignition system will be turned off and there is no vehicle speed of the towed vehicle 110. Towing may also be performed by coupling the vehicle 110 to a drawing vehicle, i.e., the towed vehicle 110 will have the gear shift in neutral position and there will be a vehicle speed. These two types of towing may both be detected by monitoring certain vehicle related data 560. In some embodiments, the two different towing modes are also reflecting in two different values of the mobility status 566. A mobility status 566 of "parking" may be determined, e.g., by analyzing whether the engine is shut off.

In one embodiment, an expected change of the mobility status 566 may be determined in advance. For example, an expected transition from parking to driving may be detected with a certain degree of probability. This may be established by determining that the number of detected passengers in the vehicle 110 recently went lower, that the doors have been unlocked, and/or that at least one door has been opened and closed. The significance of the estimate may be improved if certain vehicle parameters follow a pattern that is monitored, e.g., if there is, at first, an unlocking of a previously locked door, followed by an opening of the door and an increase of the number of passengers 155 in the vehicle 110, continued by a closing of the door and a starting of the engine of the vehicle 110. The more vehicle related data 560 is analyzed in correlation to each other, the more precise the estimate of the mobility status 566 will be.

Similarly, a transition from driving to parking may be estimated based on an increased number of detected passengers in the vehicle 110, the locking of the doors, and the opening and closing of at least one door, a reduced vehicle speed, the use of the reverse gear, steering actions indicative for entering a parking lot, and/or location information that indicates the searching of a parking lot.

The benefit of estimating an expected change of the mobility status 566 is to provide services that use the mobility status changes as triggers for events, e.g., in real-time without any significant delay: In one embodiment, a parking lot finder application may be provided to vehicle drivers. As soon as another vehicle driver is likely to leave a parking lot with his or her vehicle, a user 150 of a vehicle 110 in vicinity of the leaving vehicle, preferably already detected as a vehicle searching for a parking lot, may be informed about the location of the vehicle expected to leave and guided thereto.

The benefit of determining a mobility status 566 with a higher degree of probability is to attach services to the detection of a certain mobility status 566, e.g., for payment services based on a certain mobility status 566. In one embodiment, the mobility status 566 of "fueling" may be determined if the vehicle 110 has been stopped and the fuel level is increasing. Based on a mobility status 566 of "fueling" at a determined location 564, automatic payment for the measured increase of the fuel level may be initiated, or an appropriate amount of bonus may be deducted from the bonus account 530.

In some embodiments, the vehicle driver may trigger a task initiated at the server 140, e.g., a payment or the release of a reward, by performing a user action in or around the vehicle 110 that may be detected by the data collection device 120, i.e., the user action is reflected in the collected vehicle related data 520 and transmitted to the server 140. Such a user action may cause a specific pattern in the collected vehicle related data 520 that is detected at the server 140. The detected pattern may comprise location information 564, e.g., the user action will only cause a certain effect if it is performed in an allowed location area or at a certain location. The triggered task may also comprise the release of a reward, e.g., the receiving of a free parking reward triggered if the vehicle slows down in front of the entrance of a parking deck.

In some embodiments, further valuable information is gathered at the server 140 by storing a profile of accompanying persons 150, 155 and devices 152, 157 in the vehicle-specific location database.

Implementation Mechanisms

According to an embodiment, the server 140, the data collection device 120, and other methods and techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, hand-held devices, networking devices, smartphone devices, or any other device or combination of devices that incorporate hard-wired and/or program logic to implement the techniques.

Computing devices are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface (GUI), among other things.

Figure 6:
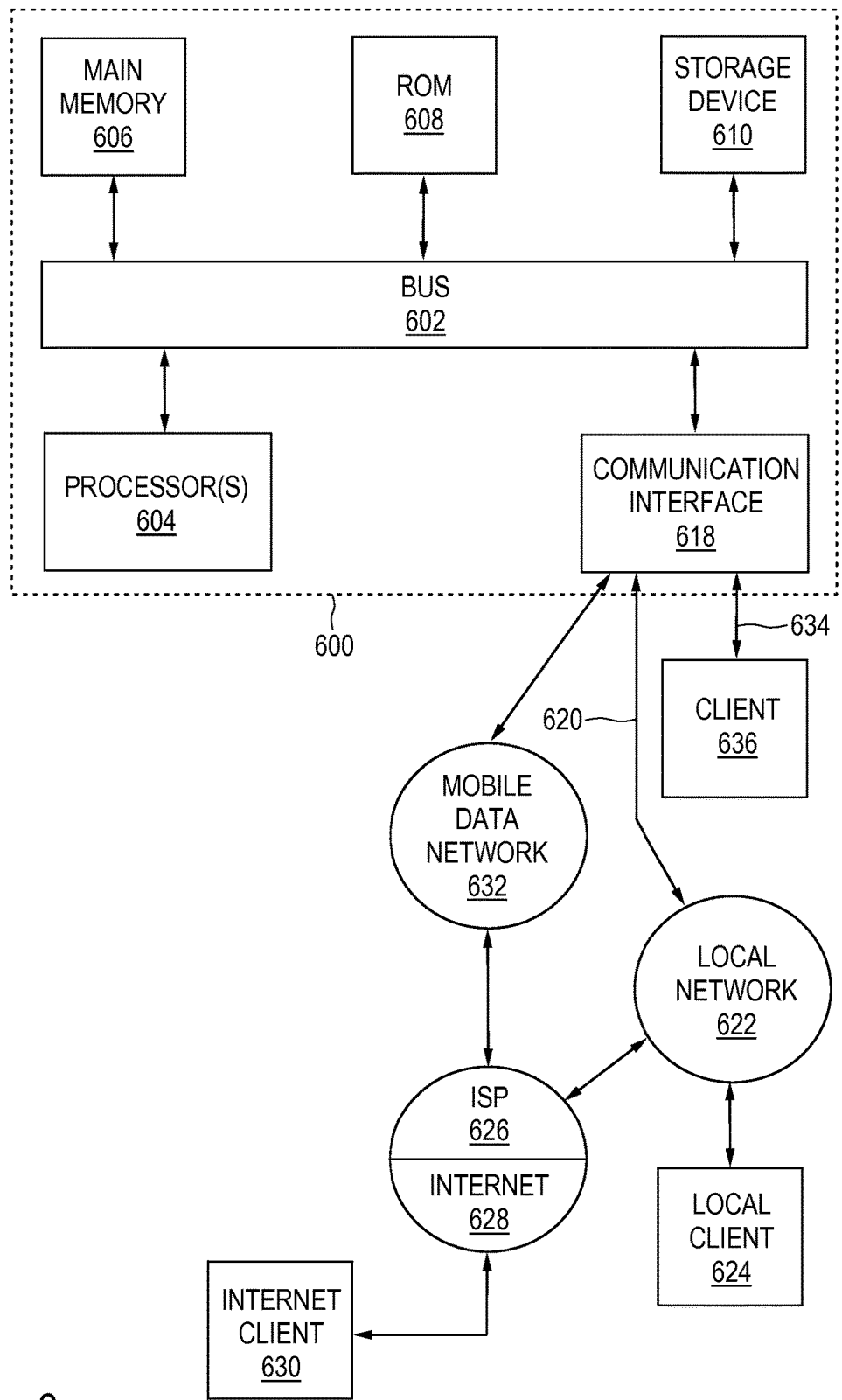
FIG. 6 illustrates a example of a computer system that may be used to implement at least one of the server and the data collection device according to an embodiment of the present disclosure.

For example, FIG. 6 is a block diagram that illustrates a computer system 600 upon which the server 140, the data collection device 120, any client device and methods discussed herein may be implemented. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

In some embodiments, the computer system 600 may be coupled via bus 602 to a display, such as a cathode ray tube (CRT), LCD display, or touch screen display, and/or an input device.

Computer system 600 may include a user interface module, and/or various other types of modules to implement a GUI to configure or to use the applications hosted on the computer system 600.

The modules and applications may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module", as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware.

Generally, the modules described herein refer to logical modules that may be combined with other modules or divided into sub-modules despite their physical organization or storage.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to the one or more processors 604 executing one or more sequences of one or more modules and/or instructions contained in main memory 606. Such instructions may be read into main memory 606 from another storage medium, such as storage device 610. Execution of the sequences of instructions contained in main memory 606 causes the one or more processors 604 to perform the process steps described herein. In alternative embodiments, hard-wired circuitry may be used in place of or in combination with software instructions.

The term "non-transitory media", and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, a DVD-ROM, a Bluray disc, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions and/or modules into its dynamic memory and send the instructions over a telephone line or wireless connection using a modem. A modem local to computer system 600 can receive the data on the telephone line or the wireless connection and use appropriate circuitry to place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication. In one example, the communication interface 618 couples to a network link 620 that is connected to a local network 622. For example, communication interface 618 may be a wired interface realized as an integrated services digital network (ISDN) card, digital subscriber line (DSL) modem, cable modem, satellite modem, or a modem to provide a data communication connection to a corresponding type of telephone line. As an example, communication interface 618 may be a local area network (LAN) card to provide a data communication connection to a compatible LAN (or WAN component to communicate with a WAN). As another example, communication interface 618 may provide the network link 620 based on a wireless connection, e.g. a Wireless LAN (WLAN) or a Wireless Wide-Area Network (WWAN). In one embodiment, the WLAN is specified according to IEEE 802.11. In another embodiment, the WWAN is specified according to IEEE 802.16. Network link 620 typically provides data communication through one or more networks to other data devices. For example, network link 620 may provide a connection through local network 622 to a local client 624 or to data equipment operated by an Internet Service Provider (ISP) 626. ISP 626 in turn provides data communication services through the world wide packet data communication network now commonly referred to as the "Internet" 628.

In yet another example, communication interface 618 may be a wireless modem to establish connection to a mobile data network 632 of a mobile network operator acting as Internet Service Provider (ISP) 626 to provide data communication services through the Internet 628. The mobile data network 632 may be, e.g., a GSM, GPRS, EDGE, UMTS, HSPA, HSDPA, HSUPA, LTE, or EVDO network.

In another example, communication interface 618 may provide a point-to-point connection 634 to a client 636 or a point-to-multipoint connection to one or more clients, either over a wired or a wireless connection. In some examples, the point-to-point or point-to-multipoint connection may be implemented over a wired connection according to the USB or Firewire standard. In other examples, the point-to-point connection 634 to the client 636 or the point-to-multipoint connection one or more clients may be implemented as a wireless network, e.g. a Wireless Personal-Area Network (WPAN). In some embodiments, the WPAN is realized in Bluetooth or Near Field Communication (NFC) technology. Computer system 600 may also gain access to the Internet 628 by connecting to a client 636 over a point-to-point or point-to-multipoint connection if the client has Internet access and is configured to share Internet access to connected devices.

Computer system 600 may implement a plurality of communication interfaces 618 offering the same or different types of communication interfaces 618 as described above. In any such implementation, communication interface 618 sends and receives electrical, electromagnetic or optical signals that carry digital data streams representing various types of information. Local network 622 and its network link 620, mobile data network 632, and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the networks, links and connections coupled to communication interface 618, e.g., to communicate with the client 636 in a point-to-point or point-to-multipoint connection or with the local client 624 through the network link 620. In the Internet example, an Internet client 630 might transmit a request to computer system 600.

The data processing function 240, the reward function 250, and the database function 260 may be implemented on at least one instance of computer system 600 acting as the server 140. The functionality may be split among a plurality of computer systems 600 depending on the expected system load. The server communication module 145 may be implemented in any of the variants disclosed for communication interface 618 which may also be realized as external component to the server 140. The server 140 may, in some embodiments, also comprise a display device and/or a keyboard, or it may be a rack based server that is controlled via a remote user interface.

Another instance of the computer system 600 may implement the data collection function 220, the data buffer function 225, the device configuration function 230, and the data transmission function 235 of the data collection device 120. The data collection device communication module 125 may be implemented in any of the variants disclosed for communication interface 618. There may be either a point-to-point connection 634, a point-to-multipoint connection, a network link 620, or a connection via Internet 628 between data collection device communication module 125 and server communication module 145. In some embodiments, the data collection device 120 does not contain a display device or an input device such as a keypad. However, there are also embodiments in which certain input and/or display elements are provided.

On the other hand, also client devices used for configuring, managing, and using an application on the server 140 or the data collection device 120 may be implemented as instances of computer system 600. In an embodiment, the computer system 600 may comprise a mobile communication device 152, 157, such as a cell phone, smartphone, and/or tablet. The system may be accessible by the user 150 or a passenger 155 through such a mobile communication device 152, 157, among other types of electronic devices.

In an embodiment, the data collection device 120 may be accessible by the user 150 through a web-based viewer, such as a web browser to remotely configure the data collection device 120, e.g. to define the parameters available for collection, to define the accuracy of the collected vehicle related data 520, or to activate and deactivate the data collection device 120, at least temporarily or based on user specific settings or events that may be detected by the data collection device 120. In other embodiments, the data collection device 120 is configurable through server 140 which in turn provides a web-based interface to handle the configuration tasks of the data collection devices 120.

Aspects of embodiments of the present disclosure are further explained and defined by the following non-limiting Enumerated Example Embodiments (EEEs):

EEE 1: A method for obtaining and using vehicle related data, the method comprising: maintaining a bonus account that is associated with at least one of a user of a vehicle and a data collection device associated with a vehicle; receiving data from the data collection device, wherein the received data comprises at least information regarding at least one of a location and a mobility status of the vehicle; crediting a bonus to the bonus account; and processing the data for marketing purposes.

EEE 2: The method according to EEE 1, wherein the data collection device is an integrated part or a factory-installed part of the vehicle.

EEE 3: The method according to EEE 1, wherein the data collection device is an retrofitted device removably installed in the vehicle.

EEE 4: The method according to any of EEEs 1-3, wherein the data received from the data collection device further comprises information that represents status and status change information of vehicle components.

EEE 5: The method according to any of EEEs 1-4, wherein the bonus depends on at least one of a time interval during which the data collection device collects the data, a driven distance during which the data collection device collects the data, an amount of data collected by the data collection device, and an amount of data received from the data collection device.

EEE 6: The method according to any of EEEs 1-5, further comprising: registering the data collection device to at least one user, wherein the at least one user is entitled to spend bonus from the bonus account to obtain a reward.

EEE 7: The method according to EEE 6, wherein the reward comprises compensating, at least in part, for the $CO_2$ emission of the vehicle.

EEE 8: The method according to EEE 6, wherein the reward comprises an at least partial payment of a charged transaction.

EEE 9. A method for triggering a task, the method comprising: defining a user action to be performed at a determined location of a vehicle; receiving data from a data collection device associated with the vehicle, wherein the received data comprises at least information regarding a detected user action and a location of the vehicle; if the collected data comprises information indicative of the defined user action at the determined location, triggering a task.

EEE 10: The method according to EEE 9, further comprising: maintaining a bonus account that is associated with at least one of a user and the data collection device associated with the vehicle; wherein triggering a task comprises spending bonus from the bonus account to release a reward.

EEE 11: A method for estimating a mobility status of a vehicle, the method comprising: receiving data from a data collection device associated with a vehicle, wherein the received data comprises a first data set collected at a first point of time and a second data set collected at a second point of time; estimating a mobility status of the vehicle based on a difference between values or a status change of at least one common parameter of the first data set and the second data set and based on the time difference between the first point of time and the second point of time; and storing the estimated mobility status of the vehicle at multiple points of time in a vehicle-specific mobility status database.

EEE 12: The method according to EEE 11, further comprising: receiving at least one third data set, wherein the third data set has been collected by the data collection device at a third point of time different from the first and second points of time, wherein estimating the mobility status is further based on the difference between values or the status change of at least one common parameter of the first, second and third data sets.

EEE 13: The method according to EEE 11 or EEE 12, further comprising: determining a location of the vehicle from the received data, wherein each estimated mobility status refers to a respective determined location, and wherein storing the estimated mobility status at multiple points of time further comprises storing the location in the vehicle-specific mobility status database.

EEE 14: The method according to EEE 13, further comprising determining a distance between the location of the vehicle at the first point of time and the location of the vehicle at the second point of time; if the determined distance is within a predetermined position accuracy and if the difference between the first point of time and the second point of time exceeds a predetermined parking time threshold, estimating that the mobility status of the vehicle is "parking".

EEE 15: The method according to any of EEEs 11-14, wherein the at least one common parameter comprises arrival information that is indicative of at least one of (i) a person leaving a parked vehicle and (ii) shutting off an engine of the vehicle; if the arrival information indicates that a person has left the vehicle or has shut off the engine of the vehicle, estimating that the mobility status of the vehicle is "parking".

EEE 16: The method according to EEE 15, wherein the arrival information further comprises information that is indicative of at least one of locking a door, opening and closing the door, and a detection that the number of passengers in the vehicle has decreased.

EEE 17: The method according to any of EEEs 11-14, wherein the at least one common parameter comprises arrival information that is indicative of at least one of searching for a parking lot and driving into a parking lot; if the arrival information indicates the searching of a parking lot or the driving into a parking lot, estimating that the mobility status of the vehicle is "preparing to park".

EEE 18: The method according to EEE 17, wherein the arrival information comprises information that is indicative of at least one of slowing down the vehicle speed, using a reverse gear, and releasing a seat belt.

EEE 19: The method according to any of EEEs 14-18, wherein storing the determined location at multiple points of time is only performed when the estimated mobility status is "parking", thereby creating a vehicle-specific location database limited to the points of destination without any route information in between.

EEE 20: The method according to any of EEEs 14-19, further comprising: when the estimated mobility status is "parking", deleting at least some stored locations which have been passed since a previous location, the previous location having the estimated mobility status of "parking".

EEE 21: The method according to any of EEEs 11-20, further comprising: determining a distance between the location of the vehicle at the first point of time and the location of the vehicle at the second point of time; if the determined distance exceeds a predetermined position accuracy, estimating that the mobility status of the vehicle is "driving".

EEE 22: The method according to any of EEEs 11-21, wherein the at least one common parameter comprises driving information that is indicative of a vehicle operated in moving traffic; if the driving information indicates that the vehicle is operated in moving traffic, estimating that the mobility status of the vehicle is "driving".

EEE 23: The method according to EEE 22, wherein the driving information comprises at least one of information about vehicle speed, shifting a gear, applying a clutch, and applying brakes.

EEE 24: The method according to any of EEEs 11-23, wherein the at least one common parameter comprises departing information that is indicative of at least one of (i) a person entering the parked vehicle and (ii) starting an engine of the vehicle; if the latest estimated mobility status is "parking" and if the departing information indicates that a person has entered the vehicle or has started the engine of the vehicle, estimating that the mobility status of the vehicle is "preparing to drive".

EEE 25: The method according to EEE 24, wherein the departing information further comprises information that is indicative of at least one of unlocking a door of the vehicle, opening and closing the door, and a detection that the number of passengers in the vehicle has increased.

EEE 26: The method according to any of EEEs 11-25, wherein the at least one common parameter comprises towing information that is indicative at least of (i) a vehicle being towed and (ii) a vehicle being moved without its own engine power; if the towing information indicates that the vehicle is towed or moved without its own engine power, estimating that the mobility status of the vehicle is "towing".

EEE 27: The method according to EEE 26, wherein the towing information further comprises information that is indicative of at least one of location changes while the vehicle speed is essentially zero, and a gearshift in neutral position while the vehicle speed indicates a movement of the vehicle.

EEE 28: The method according to any of EEEs 11-27, further comprising the method according to any of EEEs 1-10.

EEE 29: A data collection device for coupling an on-board diagnosis system of a vehicle to a server, the data collection device comprising: an interface for vehicle related data, the interface being configured to be connected to the on-board diagnosis system; a communications module that is configured to communicate with the server; wherein the data collection device is configured to collect data by reading vehicle related data from the on-board diagnosis system over the vehicle related data interface and to send the collected data to the server over the communications module; wherein the data collection device is further configured to allow the reading of at least one determined type of vehicle related data from the on-board diagnosis system or to deny the reading of at least one determined type of vehicle related data from the on-board diagnosis system.

EEE 30: The data collection device according to EEE 29, wherein the data collection device is further configured to reduce accuracy of collected data that are sent to the server.

EEE 31: The data collection device according to EEE 29 or EEE 30, wherein the data collection device is further configured to collect data by retrieving location information of the vehicle via the vehicle related data interface or from a receiver of a satellite navigation system coupled to the data collection device.

EEE 32: The data collection device according to any of EEEs 29-31, wherein the data collection device is further configured to collect data about persons or devices in or around the vehicle obtained from a sensor or a wireless communications module coupled to the data collection device.

EEE 33: A system, comprising: a server, comprising a data processing function, a reward function, and a database function; at least one data collection device, comprising a data collection function, a data buffer function, a data transmission function, and a device configuration function; wherein the system is configured to perform the method according to any of EEEs 1-28.

EEE 34: A tangible or non-tangible computer-readable storage medium comprising a set of instructions that causes one or more processors of a computer system, when executed on the one or more processors, to perform the steps or implement the elements according to any of EEEs 1-28.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can", "could", "might", or "may", unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached Figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method for obtaining and using vehicle related data, the method comprising:
    maintaining a bonus account that is associated with at least one of a user of a vehicle and a data collection device associated with a vehicle;
    receiving, at a server, vehicle related data from the data collection device, wherein the received vehicle related data comprises at least information regarding at least one of a location and a mobility status of the vehicle;
    crediting a bonus to the bonus account as a reward for a permission given by the user to process the vehicle related data for marketing purposes; and
    processing the vehicle related data for marketing purposes, comprising analyzing, by the server, the received vehicle related data to determine a need for at least one of fuel, service or repair of the vehicle.

2. The method according to claim 1, wherein the data collection device is a retrofitted device that is removably installed in the vehicle.

3. The method according to claim 1, wherein the vehicle related data received from the data collection device further comprises information that represents status and status change information of vehicle components.

4. The method according to claim 1, wherein the bonus depends on at least one of a time interval during which the data collection device collects the vehicle related data, a driven distance during which the data collection device collects the vehicle related data, an amount of vehicle related data collected by the data collection device irrespective of data content, and an amount of vehicle related data received from the data collection device irrespective of data content.

5. The method according to claim 1, further comprising: registering the data collection device to at least one user, wherein the at least one user is entitled to spend bonus from the bonus account to obtain a reward.

6. The method according to claim 5, wherein the reward comprises at least a partial payment for a transaction.

7. The method of claim 1, wherein the bonus is credited to the bonus account as a reward for a permission given by the user to process the vehicle related data for marketing purposes.

8. The method of claim 1, wherein analyzing, by the server, the received vehicle related data comprises determining whether or not a fuel level is below a certain limit.

9. The method of claim 1, wherein analyzing, by the server, the received vehicle related data comprises determining whether or not certain error codes are present.

10. The method of claim 1, wherein processing the vehicle related data for marketing purposes comprises informing the user or a passenger of the vehicle about at least one of (i) business entities, (ii) their products, and (iii) their services in the vicinity of a parking location or a current location of the vehicle or a location where the vehicle can be expected to drive by in the future.

11. The method of claim 1, wherein processing the vehicle related data for marketing purposes comprises determining at least one of (i) business entities, (ii) their products, and (iii) their services that match given correlation criteria.

12. The method of claim 1, wherein the server is external to and remote from the vehicle.

* * * * *